United States Patent [19]

Krukovsky

[11] Patent Number: 5,004,225
[45] Date of Patent: Apr. 2, 1991

[54] SIMULATED OBSERVATION FLIGHT APPARATUS

[76] Inventor: Yuri Krukovsky, 43 Saint Marks Pl. #6D, New York, N.Y. 10003

[21] Appl. No.: 431,733

[22] Filed: Nov. 1, 1989

[51] Int. Cl.$^5$ ............................................. H63G 31/16
[52] U.S. Cl. ............................................ 272/18; 272/6
[58] Field of Search ................... 272/18, 16, 8 R, 1 R, 272/6

[56] References Cited

U.S. PATENT DOCUMENTS

| 836,614 | 11/1906 | Sutherland | 272/32 |
| 895,176 | 8/1908 | Gaynor | 272/2 |
| 3,868,107 | 2/1975 | Ichida | 272/18 |
| 3,933,326 | 1/1976 | Schauffler | 272/18 X |
| 4,710,129 | 12/1987 | Newman et al. | 272/18 X |

Primary Examiner—Richard E. Chilcot, Jr.
Attorney, Agent, or Firm—Robert W. J. Usher

[57] ABSTRACT

Simulated observation flight apparatus includes a cabin mounted for passenger transportation to very high tower observation deck. The cabin houses display means producing a window-type display, display storage devices to play a real-life panorama or other picture, remote microprocessors to control display storage devices and to produce computer generated pictures on said display means, a CPU to control the cabin movement, to synchronize the display change with the movement of the cabin and to control remote microprocessors. The cabin also houses panels comprising indicators for monitoring current information data, speakers for audio accompaniment, user operable control means for interacting with the displayed picture, for playing a game and for limited control of the cabin movement to create a brief sense of weightlessness.

10 Claims, 3 Drawing Sheets

SIMULATED OBSERVATION FLIGHT APPARATUS

BACKGROUND OF THE INVENTION

1. Field of the Invention

The present invention relates to an amusement ride and, more specifically, to simulated panoramic views apparatus.

2. Prior Art

Known types of simulated panoramic views apparatuses are specially constructed towers, gondolas or cabins to reproduce simulated situation corresponding to a sense of movement and visual and acoustic senses.

For example, "Simulated Viewing Apparatus" U.S. Pat. No. 3,868,107 to I. Ichida, 1975, Feb. 25) is a bulky and costly construction with a metal tower, circular pool and a spherical dome with a cinema projector. Such apparatus is too complicated for realization and does not provide the user a multi-window display picture and the opportunity to interact with the simulated panorama and to control the cabin movement.

Another "Observation/Interpretation System" U.S. Pat. No. 3,933,326 to P. Schaufler, 1976, Jan. 20) is also a mechanically complicated apparatus with a cinema projector and has the same disadvantages.

Known apparatuses do not provide multi-window display of the external panorama around the building changing with the movement of the cabin during a real high speed flight. They also do not give the user opportunity to interact with the simulated external environment, to control movement of the cabin, to get current information data and to play game.

SUMMARY OF THE INVENTION

An object of the present invention is to provide simulated observation flight apparatus allowing a person to observe multi-window display of a real-life panorama around the building, which changes during the high speed passenger transportation up to a very high tower observation deck and down in more attractive, simple and inexpensive way.

Another object of the present invention is to provide such an apparatus allowing a person to interact with simulated external environment, to control the apparatus movement in the limited range and to play game.

Further object of the present invention is to provide such an apparatus allowing a person to get current information data about all parameters of the high speed ascent and descent.

The foregoing objects can be accomplished by providing an apparatus having a cabin mounted for passenger transportation up to a very high tower observation deck and down, display means in said cabin producing multy window-type display, display storage devices for playing panorama or other pictures matched with each other or independent, remote microprocessors for providing synchronization of said display storage devices and for producing a computer generated picture in response of control inputs from CPU, CPU for controlling the movement of the cabin and for synchronizing the picture change on said display means with the movement of the cabin, control panels, having plurality of indicators for monitoring current information data, speakers for stereophonic audio accompaniment, the user operable control means for interacting with display picture, for playing games and for a limited control of the cabin movement to create a sense of a short time "weightlessness".

Apparatus of this invention is intended for enlarging a memorable adventure of visiting a high tower observation deck in more informative and dramatic manner.

Such apparatus may be arranged to act as a real-life simulator. Display storage devices, for example VCRs, will produce on the display means a picture of a real-life panorama expansion around the building with sound accompaniment in accordance with the ascent of the cabin. The general aim of the relationship between the cabin movement and displayed panorama is for a passenger to see display means as windows to the external environment. Such high speed movement together with the observation of a changing display of an external environment gives a person a dynamic sense of a real flight and creates an atmosphere similar to an actual situation.

The real-life panorama picture can be recorded, for example, by a drawing a camcorder up and down along the external sides of the building and, when displaying, the change of the pictures on the screens of the display means have to be synchronized with the movement of the cabin.

It would be enough to make a real-life parorama records for the four parts of a day and for each season of an year and change them in accordance with outer situation.

In the arrangement of the display means may be used flat-panel TV displays and also HDTV, holography, laser projection or other techniques.

The cabin of the apparatus may be arranged as an aircraft cockpit or a space capsule and can include a control panel to play a game. The display storage devices may produce the background display for a simulated space rocket start or landing, when the cabin moves up and down, and for a flight in outer space or an ocean diving, etc.

CPU and remote microproccessors may be programmed to superimpose on the panorama display any slowly moving symbols, for example, ads advertisements or titles of companies and even point out some of them on the real-life parorama picture by a cursor.

The display which enables the user to play a game also may be superimposed on the picture of the simulated external environment which changes with the movement of the cabin, for example, an alien object moving across the window screen, etc. In this instance the apparatus of the present invention may be considered to combine a real-life and a game simulation.

In another case the CPU controls the remote microprocessessors to produce computer generated full screen display games matched with the displays on each screens or independently.

Control means on the manually operable control panels of the apparatus are employed by the user to enable the interaction with a simulated external environment during the game and to control the cabin movement in limited range.

A separate joystick, for example, is used to create a brief sense of weightlessness by a computer controlled slowing down a speed of the cabin movement upwards or accelerating it when the cabin moves down.

In that case chairs, rails or other support means may be installed in the cabin.

Control panels include also indicators for monitoring the current information data such as values of altitude, pressure, speed of the movement, time count, etc.

Another control means such as light pen, light gun and remote control devices may be used to interact with the display picture.

In the case of a game the apparatus may be coin operated and be activated for a limited period of time.

DETAILED DESCRIPTION

Figure 1:
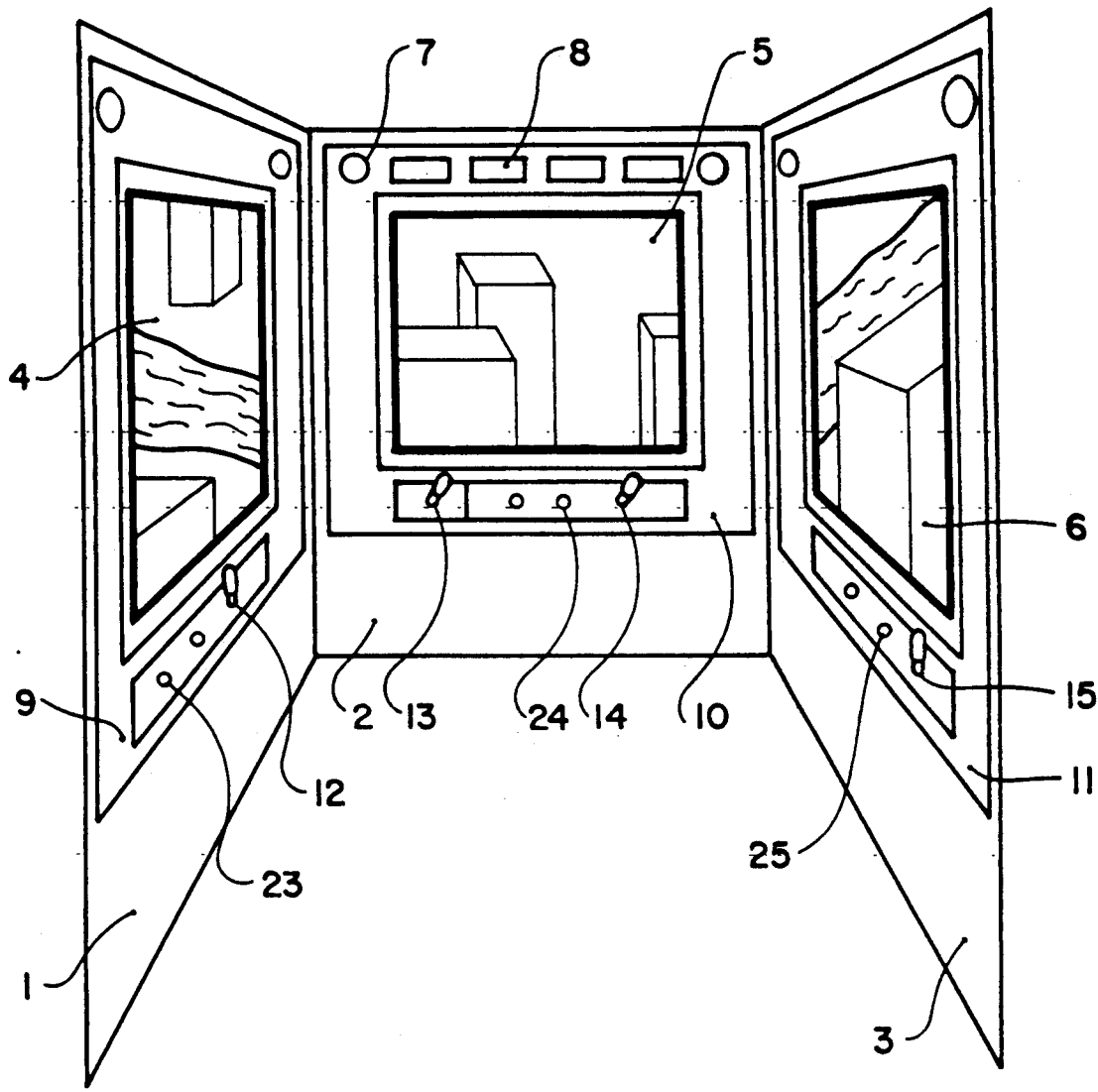
FIG. 1 is a fragmentary and schematic perspective view of the cabin of the apparatus from a side of a door according to one embodiment of the invention.

In the illustrated embodiment (see FIG. 1) the display means 4, 5, 6 are mounted on the walls 1, 2, 3 of the cabin, which may be the cabin of a high speed elevator 26.

Control panels 9, 10, 11, which include indicators 8, speakers 7, the user operable switches 23, 24, 25 and joysticks 12, 13, 14, 15, are also mounted on these walls.

Figure 2:
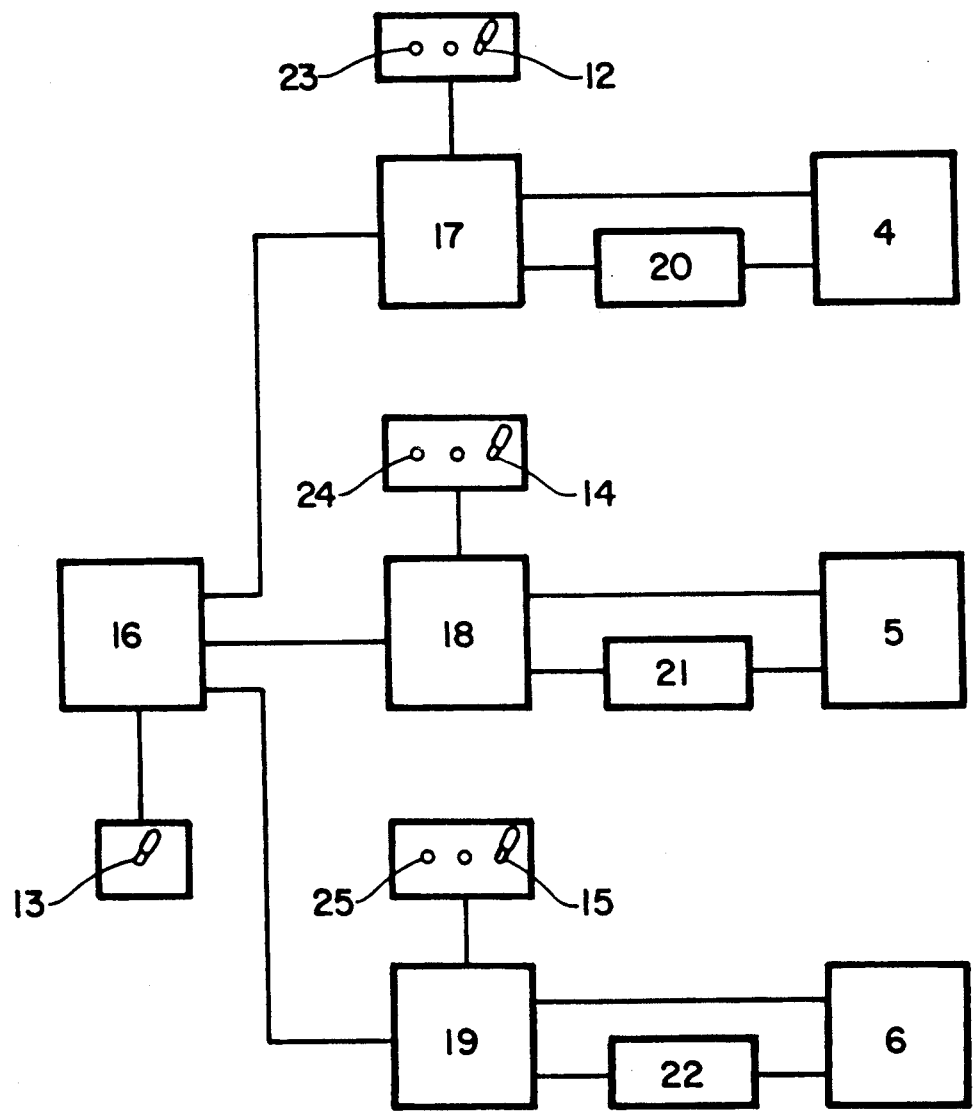
FIG. 2 is a block-circuit diagram of one embodiment of the apparatus circuit arrangement; and, FIG. 3 is a schematic elevational view partly in cross-section of an elevator and tower incorporating the invention.
Figure 3:
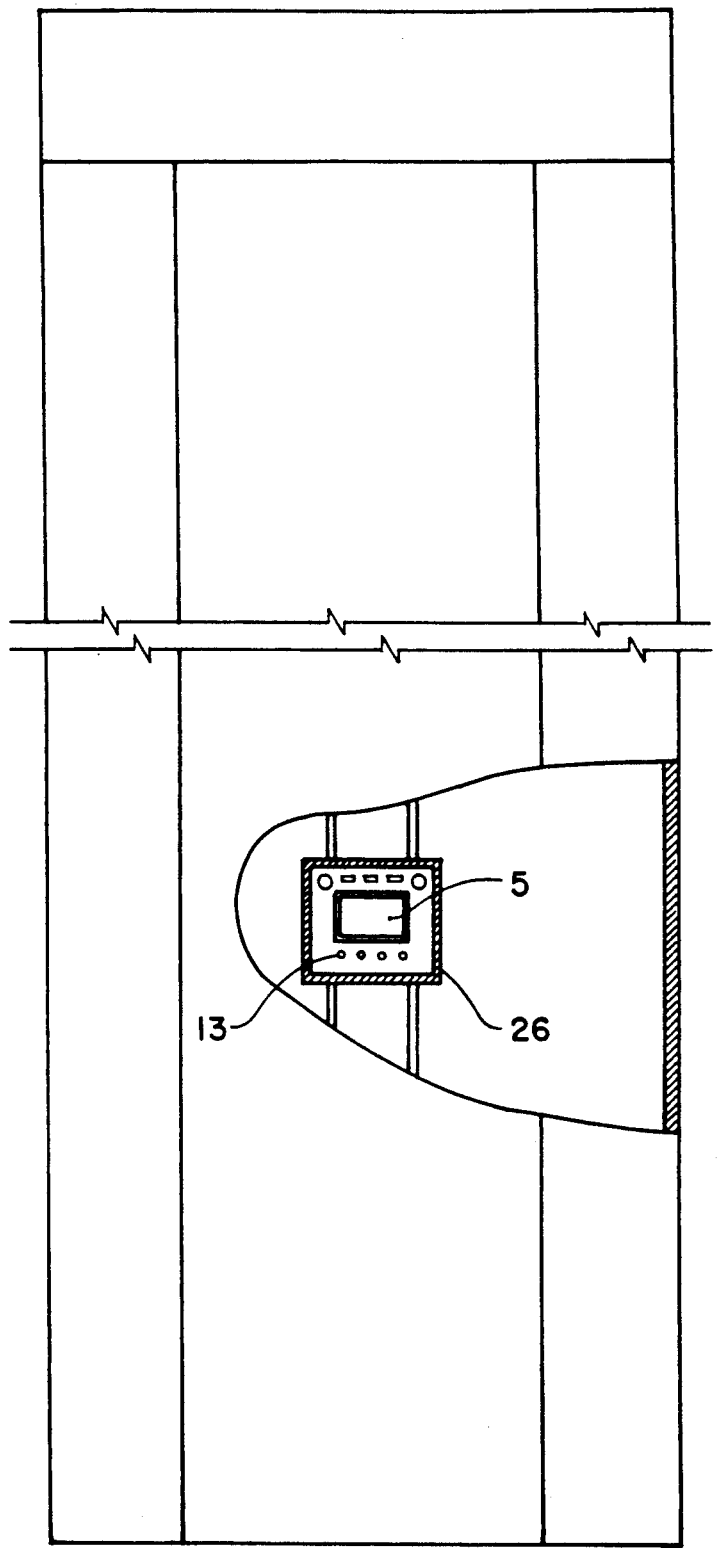

When the movement of the cabin begins passengers can observe a real-life panorama expansion around the building displayed on the screens and get a physical sense of a true high speed flight. The multi-window type display is generated by display storage devices 20, 21, 22, for example, usual VCRs which output video signals to display means 4, 5, 6 (see FIG. 2).

A CPU 16 is programmed to control display storage devices 20, 21, 22 through remote microproccessors 17, 18, 19 to provide a picture change on the window screens in synchronized relationship with the movement in the cabin.

Any other panorama, for example, simulated views of various external environment, may be displayed simply by replacing the memory cartridge in the display storage devices 20, 21, 22.

Memories of the remote microproccessors 17, 18, 19 store the picture elements and a video game program. CPU 16 also permits the remote microprocessors 17, 18, 19 to produce computer generated picture superimposed on the background display matched with displays on each screen or independent. These pictures may be an alien object, additional information data, ads, titles of companies, cursor, etc. The remote microproccessors 17, 18, 19 in response to control signals from CPU 16 may also generate full screen game picture on each display means 4, 5, 6 matched with each other or independent.

A game player can interact with a simulated view using joysticks 12, 14, 15 and switches 23, 24, 25 which provide inputs to the remote microproccessors 17, 18, 19.

The movement of the cabin is controlled by CPU 16 which is programmed to allow the user a limited control of that movement. In that case the user, by manipulation of separate joystick 13, can send input signals to CPU 16 only in the given period of time during the cabin movement up or down to produce slowing down or accelerating speed of the movement, creating thereof a brief sense "weightlessness".

At the time of the cabin movement passengers are getting additional information from indicators 8 on the control panel 10. They are monitoring time of the movement, altitude, speed of the flight and pressure, so that a passenger can even fix the value of the pressure while sensing popping in his ears.

While one embodiment of the present invention has been illustrated by the way of example, it is understood that there may be various embodiments and modifications within general scope of the invention.

What is claimed is:

1. Simulated observation apparatus comprising an enclosed elevator cabin transporting passengers to an observation deck comprising;
   display screen means mounted on at least one wall of the cabin for displaying a changing picture simulating real-life panoramic external views of the cabin;
   display storage means for generating a changing picture signal and supplying the picture signal to the display screen means; and,
   control means for operating the display storage devices to generate the changing picture during at least one of ascent and descent of the cabin.

2. Simulated observation apparatus according to claim 1 further comprising means for generating a game picture signal and supplying the game picture signal to the display screen means.

3. Simulated observation apparatus according to claim 1 wherein said control means comprises a CPU and manually operable control means in the cabin including a remote microprocessor for each of said at least one screen and connected between the CPU and both the storage means and the display screen means, whereby the microprocessors can be operated by a user manipulating the manual control means to run a game.

4. Simulated observation apparatus according to claim 1 wherein said control means comprises a CPU and remote microprocessors connected to receive control signals from the CPU and for providing operating signals to both the display storage means and the display screen means whereby the microprocessors are operated by a signal from the CPU to generate symbols on the display screen means.

5. Simulated observation apparatus according to claim 1 wherein the changing picture is a recording made by drawing a video-recorder at least one of up and down at least one external side of a building housing the elevator.

6. Simulated observation apparatus according to claim 1 wherein said control means comprises a CPU and manually operable master control means in the cabin linked to the CPU whereby change of cabin velocity can be altered by a user operating the manual master control means.

7. Simulated observation apparatus according to claim 1 wherein three display screen means are mounted on respective walls of the cabin and the control means includes a CPU programmed to supply a synchro-signal to the storage means to provide matched display of pictures on respective screens.

8. Simulated observation apparatus according to claim 1 wherein three display screen means are mounted on respective walls of the cabin and the control means includes a CPU connected to supply a synchro-signal to the storage means for displaying pictures on respective screens independently.

9. An enclosed elevator cabin transporting passengers to an observation deck having means for providing and displaying a changing window-like picture on at least one cabin wall simulating real-life panoramic views from the cabin which change during at least one of cabin ascent and descent.

10. An enclosed elevator cabin according to claim 9 wherein the picture is a recording made by drawing video recording means at least one of up and down the outside of a building housing the elevator.

* * * * *